US012619853B2

(12) United States Patent
Hazui et al.

(10) Patent No.: US 12,619,853 B2
(45) Date of Patent: May 5, 2026

(54) DECISION-MAKING DEVICE, UNMANNED SYSTEM, DECISION-MAKING METHOD, AND PROGRAM

(71) Applicant: MITSUBISHI HEAVY INDUSTRIES, LTD., Tokyo (JP)

(72) Inventors: Yusuke Hazui, Tokyo (JP); Yasuo Fujishima, Tokyo (JP); Natsuki Matsunami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1185 days.

(21) Appl. No.: 17/046,492

(22) PCT Filed: Jun. 17, 2019

(86) PCT No.: PCT/JP2019/023869
§ 371 (c)(1),
(2) Date: Oct. 9, 2020

(87) PCT Pub. No.: WO2020/004103
PCT Pub. Date: Jan. 2, 2020

(65) Prior Publication Data
US 2021/0133566 A1 May 6, 2021

(30) Foreign Application Priority Data

Jun. 28, 2018 (JP) ................................. 2018-123527

(51) Int. Cl.
*G06N 3/008* (2023.01)
*G06F 3/06* (2006.01)
(Continued)

(52) U.S. Cl.
CPC ........... *G06N 3/008* (2013.01); *G06F 3/0608* (2013.01); *G06F 3/0652* (2013.01);
(Continued)

(58) Field of Classification Search
CPC ........ G06N 3/008; G06N 3/08; G06F 3/0608; G06F 3/0652; G06F 3/0674; G06F 18/217; B64U 2201/00
See application file for complete search history.

(56) References Cited

U.S. PATENT DOCUMENTS 9,754,221 B1 9/2017 Nagaraja
2017/0140269 A1* 5/2017 Schaul ................... G06N 3/092
(Continued)

FOREIGN PATENT DOCUMENTS

CN 108108822 A * 6/2018 ............. G06N 20/00
JP 8-76810 3/1996
JP 2018-5739 1/2018

OTHER PUBLICATIONS

Mnih, Volodymyr, et al. "Playing atari with deep reinforcement learning." arXiv preprint arXiv:1312.5602 (2013). (Year: 2013).*
(Continued)

*Primary Examiner* — Sehwan Kim
(74) *Attorney, Agent, or Firm* — Wenderoth, Lind & Ponack, L.L.P.

(57) ABSTRACT

A decision-making device (2) comprising: an action selection unit (200) for selecting one of a plurality of actions that can be taken in a first state so that an environment performs the selected action; a state acquisition unit (201) for acquiring a second state indicating the state that follows the execution of the action; a reward acquisition unit (202) for acquiring a reward serving as an indicator for indicating whether or not the second state is desirable; and a storage processing unit (203) whereby experience data in which the first state, the action, the second state, and the reward are associated is stored in a storage unit (21) associated with the action, the storage unit (21) being one of a plurality of storage units.

12 Claims, 5 Drawing Sheets

(51) Int. Cl.
  *G06F 18/21* (2023.01)
  *G06N 3/08* (2023.01)

(52) U.S. Cl.
  CPC .......... *G06F 3/0674* (2013.01); *G06F 18/217* (2023.01); *G06N 3/08* (2013.01)

(56) References Cited

U.S. PATENT DOCUMENTS

| | | | |
|---|---|---|---|
| 2017/0329673 A1* | 11/2017 | Ben Dayan ......... | G06F 11/1088 |
| 2018/0052825 A1* | 2/2018 | Lipton ..................... | G06N 3/00 |
| 2018/0293498 A1* | 10/2018 | Campos ................. | G06N 3/008 |
| 2019/0042934 A1* | 2/2019 | Arunachalam ...... | G06V 10/774 |
| 2019/0113929 A1* | 4/2019 | Mukadam .............. | G08G 1/167 |
| 2019/0302708 A1* | 10/2019 | Iwane ................ | G05B 13/0265 |
| 2019/0310592 A1* | 10/2019 | Hazard ................. | G06F 18/214 |
| 2019/0339087 A1* | 11/2019 | Jindal ..................... | G06F 17/17 |
| 2020/0175364 A1* | 6/2020 | Xu .......................... | G06N 3/045 |
| 2020/0219028 A1* | 7/2020 | Papaemmanouil ......................... G06Q 10/06375 |
| 2020/0265305 A1* | 8/2020 | Budden .................... | G06N 3/08 |

OTHER PUBLICATIONS

Zuo, Sixiang, et al. "Continuous reinforcement learning from human demonstrations with integrated experience replay for autonomous driving." 2017 IEEE International Conference on Robotics and Biomimetics (ROBIO). IEEE, 2017. (Year: 2017).*

Liang, Xiaoyuan, et al. "Deep reinforcement learning for traffic light control in vehicular networks." arXiv preprint arXiv:1803.11115 (2018). (Year: 2018).*
Zhibo et al. "Parallel training divergence strategy depth reinforced learning method", CN108108822A—translation, 2018 (Year: 2018).*
Kulkarni, Tejas D., et al. "Hierarchical deep reinforcement learning: Integrating temporal abstraction and intrinsic motivation." Advances in neural information processing systems 29 (2016). (Year: 2016).*
Munemasa, Isshu, et al. "Deep reinforcement learning for recommender systems." 2018 international conference on information and communications technology (icoiact). IEEE, 2018. (Year: 2018).*
Mukadam, Mustafa, et al. "Tactical decision making for lane changing with deep reinforcement learning." (2017), NIPS 2017 Workshop on Machine Learning for Intelligent Transportation Systems. (Year: 2017).*
Mukadam, Mustafa, et al. "Tactical decision making for lane changing with deep reinforcement learning." (2018), https://openreview.net/forum?id=B1G6uMOWG (Year: 2018).*
Zhai, Jianwei et al., "Deep Q-Learning with Prioritized Sampling", Advances in Biometrics: International Conference, ICB 2007, Seoul, Korea, Aug. 27-29, 2007; Proceedings; [Lecture Notes in Computer Science; LECT.Notes Computer], Springer, Berlin, Heidelberg, pp. 13-22, XP047410140, ISBN: 978-3-540-74549-5 [retrieved on Sep. 29, 2016].
Mnih et al., "Playing Atari with Deep Reinforcement Learning", NIPS Deep Learning Workshop, Dec. 2013, pp. 1-9.
International Search Report issued Aug. 6, 2019 in International Patent Application No. PCT/JP2019/023869, with English Translation.
Written Opinion of the International Searching Authority issued Aug. 6, 2019 in International Patent Application No. PCT/JP2019/023869, with English Translation.

* cited by examiner

S15

```
         START
           │
           ▼
     ┌──────────────┐  S152A
     │  IS STORAGE  │        NO
     │  UNIT FULL?  ├──────────────┐
     └──────────────┘              │
           │ YES                   │
           ▼                       │
┌───────────────────────────────┐ │ S152B
│ DELETE MOST USED EXPERIENCE DATA│◄┘
└───────────────────────────────┘
           │
           ▼
┌───────────────────────────────┐ S152C
│     STORE EXPERIENCE DATA      │
└───────────────────────────────┘
           │
           ▼
          END
```

1

3'

2

30

DECISION-MAKING DEVICE, UNMANNED SYSTEM, DECISION-MAKING METHOD, AND PROGRAM

TECHNICAL FIELD

The present disclosure relates to a decision-making device, an unmanned system, a decision-making method, and a program.

The present application claims priority based on Japanese Patent Application No. 2018-123527 filed in Japan on Jun. 28, 2018, the contents of which are incorporated herein by reference.

BACKGROUND ART

In recent years, machine learning using deep learning, which has a high computational load, has become widespread due to high performance of computers and the like.

For example, as a technology obtained by combining deep learning and reinforcement learning, there is a technology called Deep Q Network (DQN) that learns an optimal action in a certain state of a control target (environment). In the DQN, an agent being a learning subject observes what state the state has transitioned to by an action performed when the environment is in a certain state, and acquires a reward for this state transition. The agent collects many pieces of experience data in which the state before the transition, the action, the state after the transition, and the reward are associated with each other, and approximates an action value function of obtaining a value of the action in a certain stage based on the experience data with a multilayer neutral network. In the DQN, as described above, the action value function for estimating the optimal action (can be expected to obtain the most reward) in various states is learned and updated based on the experience data.

Note that, since experience data that is continuous in time series has a strong correlation, for example, if an agent performs learning using only new stored experience data, there is a possibility that the estimation accuracy for old experience data is degraded and the convergence of the action value function is deteriorated. Therefore, in order to suppress the bias of the data used for learning, a technology called experience replay in which learning data is randomly selected from the experience data previously accumulated and then learning is performed has been considered.

If the storage area reaches the upper limit, the experience data accumulated in the experience replay is deleted in chronological order by First In First Out (FIFO). In such a manner, similar data that is close to the current time in the time series is left in the storage area.

As a method of eliminating such a bias of the experience data, for example, PTL 1 discloses a method of calculating a uniqueness parameter and deleting experience data having a high similarity with other pieces of experience data based on the uniqueness parameter. The uniqueness parameter indicates how different each piece of accumulated experience data is from other pieces of experience data.

CITATION LIST

Patent Literature

[PTL 1] Japanese Unexamined Patent Application Publication No. 2018-005739

SUMMARY OF INVENTION

Technical Problem

However, in the method in the related art, for example, in a case where the number of actions is limited, some actions may not be performed even though the actions are randomly selected. In this case, the accumulated experience data will also be biased. In addition, since the experience data includes various parameters, it may be difficult to select an appropriate uniqueness parameter. As a result, it is not possible to sufficiently eliminate the bias of the experience data accumulated in the storage area, and for example, there is a possibility that the learning opportunities are reduced and the learning accuracy is reduced, for an action having a small number of pieces of experience data.

At least one embodiment of the present invention provides a decision-making device, an unmanned system, a decision-making method, and a program in which it is possible to suppress the bias of experience data.

Solution to Problem

According to a first aspect of the present invention, a decision-making device includes an action selection unit that selects any one of a plurality of actions allowed to be taken in a first state so that an environment performs the selected action, a state acquisition unit that acquires a second state indicating a state after the action is performed, a reward acquisition unit that acquires a reward as an index indicating whether the second state is desirable, and a storage processing unit that stores experience data in a storage unit associated with the action among a plurality of storage units, the experience data being data in which the first state, the action, the second state, and the reward are associated with each other.

In this case, the decision-making device can prevent an occurrence of a situation in which the experience data stored in the storage unit is biased depending on the degree of a selection frequency of the action.

According to a second aspect of the present invention, a decision-making device includes an action selection unit that selects any one of a plurality of actions allowed to be taken in a first state so that an environment performs the selected action, a state acquisition unit that acquires a second state indicating a state after the action is performed, a reward acquisition unit that acquires a reward as an index indicating whether the second state is desirable, and a storage processing unit that stores experience data in a storage unit associated with the reward among a plurality of storage units, the experience data being data in which the first state, the action, the second state, and the reward are associated with each other.

Generally, opportunities for obtaining a high reward in reinforcement learning are often set to be small, and it is difficult to accumulate experience data associated with a high reward. Therefore, in the technology in the related art, there is a possibility that only experience data with a low reward is intensively stored. However, the decision-making device according to the above-described aspect stores the experience data in a different storage unit for each reward, and thus it is possible to suppress the bias of the experience data in the storage unit.

According to a third aspect of the present invention, in the decision-making device according to the second aspect, the storage processing unit stores the experience data in the storage unit associated with each value of the reward.

In this case, for example, when the value of the reward is a discrete value, the storage processing unit can store the experience data for each value of the reward without being biased.

According to a fourth aspect of the present invention, in the decision-making device according to the above-described second aspect, the reward acquisition unit acquires a calculation expression used in calculation of the reward, along with the reward, and the storage processing unit stores the experience data in the storage unit associated with each reward calculation expression.

In this case, even when a different calculation expression is used for each event that occurs as a result of an action, for example, in calculation of the reward, the storage processing unit can sample the experience data for each calculation expression. Thus, a situation in which experience data regarding an event (that is, calculation expression having a small use frequency) having a low occurrence frequency is overwritten by the experience data regarding an event having a high occurrence frequency does not occur. Accordingly, it is possible to suppress the bias of the experience data.

According to a fifth aspect of the present invention, in the decision-making device according to the second aspect, the storage processing unit stores the experience data in the storage unit associated with each value band of the reward.

In this case, for example, even when the value of the reward is a continuous value and a different value is set for each event, the storage processing unit can store the experience data for each value band of the reward without being biased. Thus, when there is an event that has a low occurrence frequency, but is important, the storage processing unit can more reliably store experience data regarding this event.

According to a sixth aspect of the present invention, the decision-making device according to any one of the first to fifth aspects further includes a deletion processing unit that, when the amount of the experience data stored in the storage unit reaches an upper limit value, deletes the experience data used most in learning.

In this case, the decision-making device can adjust the amount of experience data in each storage unit with a simple algorithm.

According to a seventh aspect of the present invention, the decision-making device according to any one of the first to fifth aspects further includes a deletion processing unit that, when the amount of the experience data stored in the storage unit reaches an upper limit value, deletes the experience data used most in learning.

In this case, the decision-making device can leave the experience data having a low learning frequency in the storage unit, and thus it is possible to suppress the bias of the experience data used in learning.

According to an eighth aspect of the present invention, the decision-making device according to any one of the first to seventh aspects further includes a learning unit that randomly selects and extracts a predetermined number of pieces of the experience data from each of a plurality of the storage units as learning data, and updates a learning model for estimating an action having a highest value in the first state based on the learning data.

In this case, the learning unit can select and learn the experience data associated with each of a plurality of actions or rewards without the bias.

According to a ninth aspect of the present invention, in the decision-making device according to the eighth aspect, the learning unit selects and extracts the same number of pieces of the experience data from each of the plurality of the storage units as the learning data.

In this case, the learning unit can select the experience data associated with each action or each reward without the bias and equally learn all actions or rewards, regardless of the number of times of performing each of a plurality of actions or the degree of the number of times of acquiring a plurality of rewards.

According to a tenth aspect of the present invention, in the decision-making device according to the eighth or ninth aspect, when the number of pieces of the experience data stored in the storage unit does not satisfy the predetermined number, the learning unit extracts all the pieces of the experience data as the learning data.

In this case, for example, even when the number of times of performing a certain action or the number of times of acquiring a certain reward at the beginning of the learning is small, the learning unit can learn the action or the reward.

According to an eleventh aspect of the present invention, an unmanned system includes the decision-making device according to any one of the first to tenth aspects.

In this case, the unmanned system can autonomously learn and perform the best action.

According to a twelfth aspect of the present invention, a decision-making method includes a step of selecting any one of a plurality of actions allowed to be taken in a first state so that an environment performs the selected action, a step of acquiring a second state indicating a state after the action is performed, a step of acquiring a reward as an index indicating whether the second state is desirable, and a step of storing experience data in a storage unit associated with the action among a plurality of storage units, the experience data being data in which the first state, the action, the second state, and the reward are associated with each other.

According to a thirteenth aspect of the present invention, a program causing a computer of a decision-making device to function and to perform a step of selecting any one of a plurality of actions allowed to be taken in a first state so that an environment performs the selected action, a step of acquiring a second state indicating a state after the action is performed, a step of acquiring a reward as an index indicating whether the second state is desirable, and a step of storing experience data in a storage unit associated with the action among a plurality of storage units, the experience data being data in which the first state, the action, the second state, and the reward are associated with each other.

According to a fourteenth aspect of the present invention, a decision-making method includes a step of selecting any one of a plurality of actions allowed to be taken in a first state so that an environment performs the selected action, a step of acquiring a second state indicating a state after the action is performed, a step of acquiring a reward as an index indicating whether the second state is desirable, and a step of storing experience data in a storage unit associated with the reward among a plurality of storage units, the experience data being data in which the first state, the action, the second state, and the reward are associated with each other.

According to a fifteenth aspect of the present invention, a program causing a computer of a decision-making device to function and to perform a step of selecting any one of a plurality of actions allowed to be taken in a first state so that an environment performs the selected action, a step of acquiring a second state indicating a state after the action is performed, a step of acquiring a reward as an index indicating whether the second state is desirable, and a step of storing experience data in a storage unit associated with the reward among a plurality of storage units, the experience data being data in which the first state, the action, the second state, and the reward are associated with each other.

Advantageous Effects of Invention

According to the decision-making device, the unmanned system, the decision-making method, and the program according to at least one of the above-described aspects, it is possible to suppress the bias of the experience data.

DESCRIPTION OF EMBODIMENTS

First Embodiment

Hereinafter, an unmanned system 1 and a decision-making device 2 according to a first embodiment of the present invention will be described with reference to the drawings.
(Overall Structure)
FIG. 1 is a diagram illustrating a functional configuration of an unmanned system according to the first embodiment.

Figure 1:
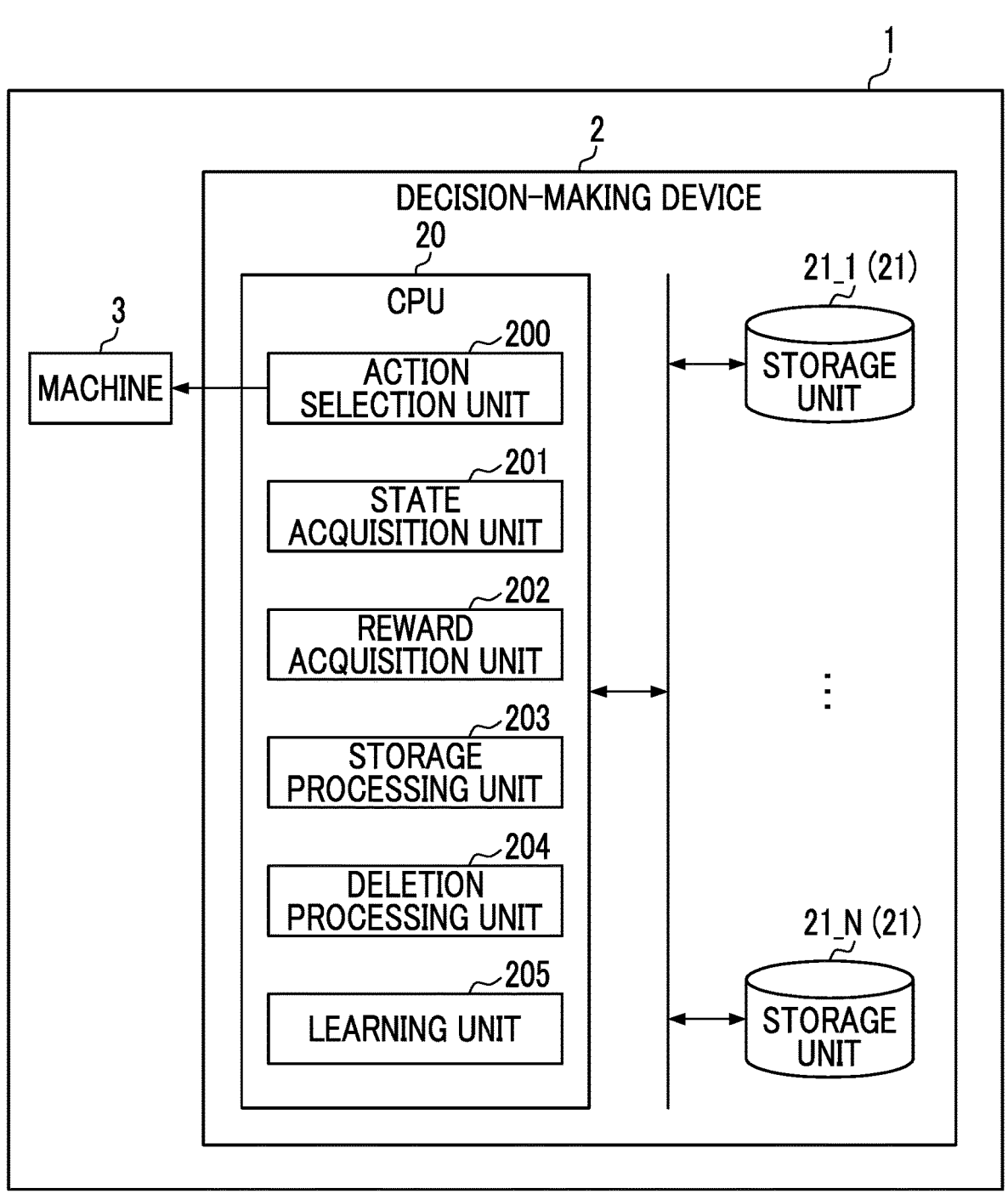
FIG. 1 is a diagram illustrating a functional configuration of an unmanned system according to a first embodiment.

As illustrated in FIG. 1, the unmanned system 1 according to the present embodiment includes a decision-making device 2 and a machine 3. The machine 3 is, for example, a machine that operates in an unmanned manner, such as an automatic driving vehicle or an automated aerial vehicle (AAV).

The decision-making device 2 according to the present embodiment determines an action in response to the state of the machine 3. In addition, the decision-making device 2 functions as an "agent" that observes what state the machine 3 has transitioned to due to an action, and performs reinforcement learning to determine an optimal action in response to the state.

The machine 3 controls an actuator, a rotor, and the like to realize the action determined by the decision-making device 2. The machine 3 is an example of an "environment" that is a target of state observation in reinforcement learning.

Note that the example of FIG. 1 illustrates a form in which the decision-making device 2 is provided outside the machine 3, but the embodiment is not limited to this. In other embodiments, the decision-making device 2 may be built in the machine 3.

(Functional Configuration)

As illustrated in FIG. 1, the decision-making device includes a CPU 20 and a plurality of storage units 21 (21_1 to 21_N).

The CPU 20 is a processor that controls the entire operation of the decision-making device 2. The CPU 20 operates in accordance with a program to exhibit functions as an action selection unit 200, a state acquisition unit 201, a reward acquisition unit 202, a storage processing unit 203, a deletion processing unit 204, and a learning unit 205.

The action selection unit 200 selects any one of a plurality of actions that may be taken in a first state and causes the machine 3 to perform the selected action.

The first state indicates the state S t of the machine 3 at a certain time t.

The state acquisition unit 201 acquires a second state indicating a state after the machine 3 performs the action.

The second state is the state $S_{t+1}$ of the machine 3 at the next time (t+1) when the machine 3 performs an action $a_t$ in the first state $S_t$.

The reward acquisition unit 202 acquires a reward $r_{t+1}$ that is an index indicating whether the second state $S_{t+1}$ is desirable.

The storage processing unit 203 stores experience data $(S_t, a_t, S_{t+1}, r_{t+1})$ in which the first state $S_t$, the action $a_t$, the second state $S_{t+1}$, and the reward $r_{t+1}$ are associated with each other, in the storage unit 21 associated with the action $a_t$ among the plurality of storage units 21.

The deletion processing unit 204 deletes the oldest experience data when the amount of experience data stored in the storage unit 21 reaches an upper limit value.

The learning unit 205 updates a learning model for estimating the optimal action for each state, based on learning data which has been randomly selected from a predetermined number of pieces of experience data from each of the plurality of storage units 21.

The plurality of storage units 21 are assigned to the plurality of actions that may be taken by the machine 3, respectively. That is, when the number of actions that may be taken by the machine 3 is n, n storage units 21_1 to 21_N are provided.
(Processing Flow)

Figure 2:
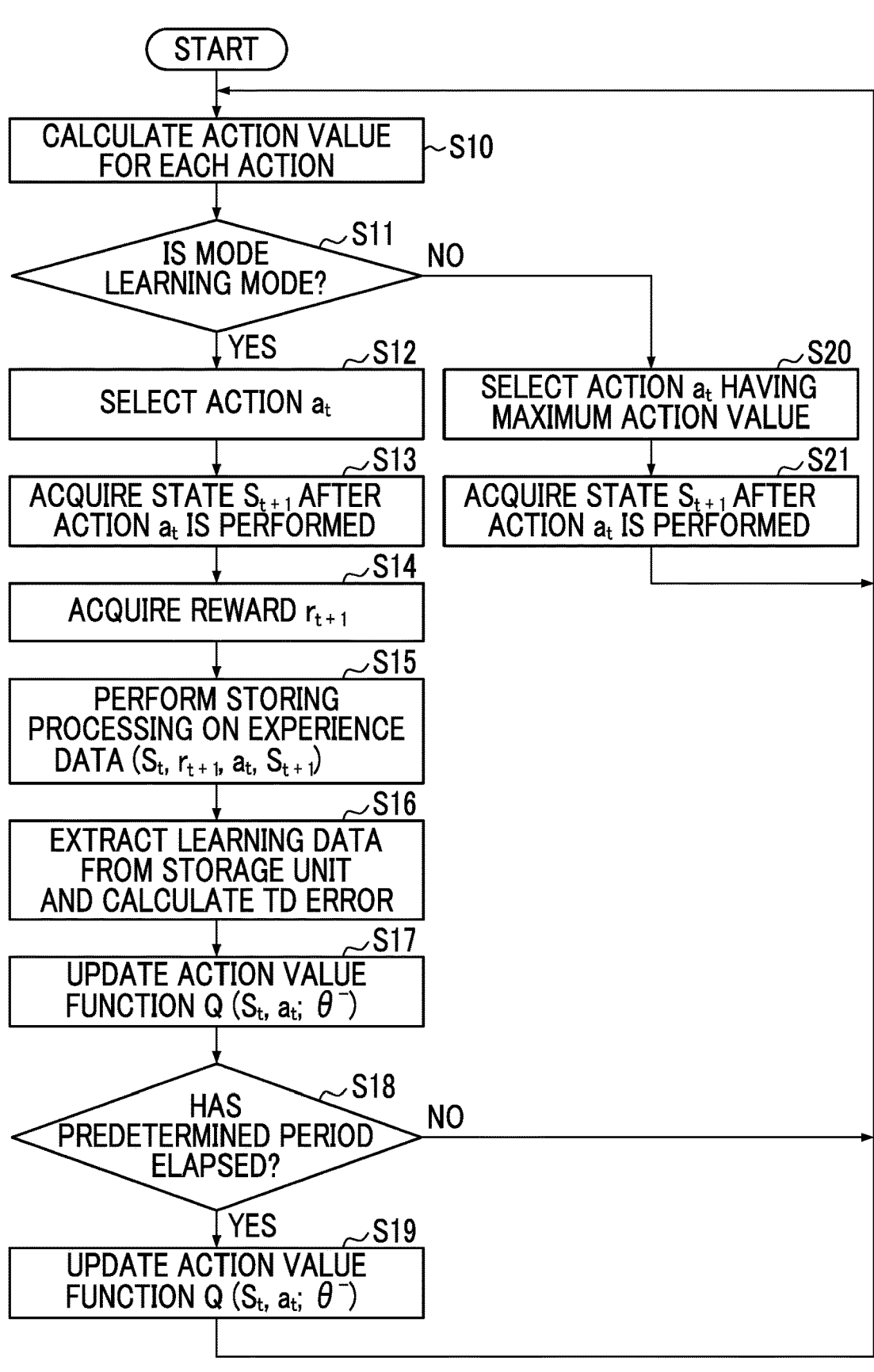
FIG. 2 is a flowchart illustrating an example of learning processing in a decision-making device according to the first embodiment.

FIG. 2 is a flowchart illustrating an example of learning processing in the decision-making device according to the first embodiment.

Figure 3:
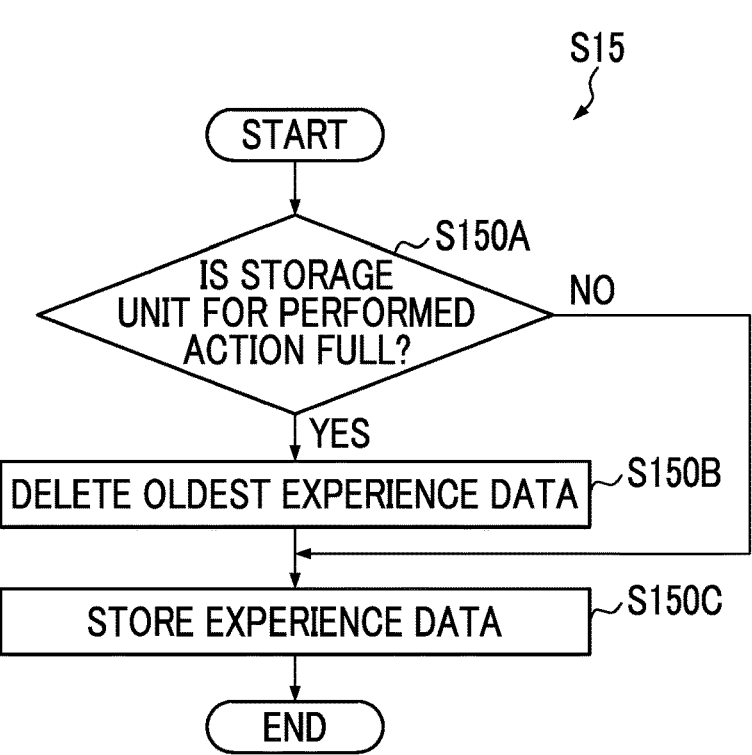
FIG. 3 is a flowchart illustrating an example of storing processing in the decision-making device according to the first embodiment.

FIG. 3 is a flowchart illustrating an example of storing processing in the decision-making device according to the first embodiment.

An example of the learning processing in the decision-making device 2 will be described below with reference to FIGS. 2 and 3.

As illustrated in FIG. 2, firstly, the action selection unit 200 in the decision-making device 2 calculates an action value based on an action value function $Q(S_t, a_t; \theta)$ for each action that may be taken in the current state of the machine 3 (Step S10).

Here, the action value function is an example of a learning model for estimating an optimal action (action having a highest value) in a certain state. $S_t$ indicates the state of the machine 3 at the current time t. $a_t$ indicates an action to be performed in the state $S_t$. $\theta$ is a weight for a parameter input to the action value function. $\theta$ is often learned and updated by the learning unit 205. The action value is an expected value of the reward that can be acquired as a result of the action $a_t$ performed in the state $S_t$.

Then, the action selection unit 200 determines whether or not the current mode of the decision-making device 2 is a learning mode (Step S11).

When the current mode is the learning mode (Step S11: YES), the action selection unit 200 performs the processes of Steps S12 to S19.

On the other hand, when the current mode is not the learning mode (Step S11: NO), the action selection unit 200 executes the processes of Steps S20 to S21.

Note that the decision-making device 2 is in the learning mode when a switching unit (not illustrated) is set to "learning mode ON", and is in a mode other than the learning mode when the switching unit is set to "learning mode OFF".

Firstly, a case where the current mode is the learning mode (Step S11: YES) will be described.

At this time, the action selection unit 200 selects any one action $a_t$ among a plurality of actions that may be taken in the current state $S_t$ (Step S12).

The action selection unit 200 may randomly select the action from the plurality of actions, or may select the action having the highest action value. The action selection unit 200 may change the proportion of randomly selecting an action and the proportion of selecting an action having a high action value, in accordance with the progress of learning. In this case, for example, the action selection unit 200 increases the proportion of selecting an action having a high action value as the learning progresses.

Then, the state acquisition unit 201 acquires the state $S_{t+1}$ of the machine 3 after the action $a_t$ is performed (next time t+1) (Step S13).

Then, the reward acquisition unit 202 acquires a reward $r_{t+1}$ from the machine 3 (Step S14). The reward $r_{t+1}$ functions as an index indicating whether the state $S_{t+1}$ acquired in Step S13 is desirable.

The reward $r_{t+1}$ is a value set for the state $S_{t+1}$ at a time (t+1) after the action $a_t$ is performed. Regarding the reward $r_{t+1}$, qualitatively, for example, a positive reward is set for the desirable state $S_{t+1}$, and a negative reward is set for the undesirable state $S_{t+1}$.

Then, the storage processing unit 203 and the deletion processing unit 204 performs storing processing on experience data $(S_t, r_{t+1}, a_t, S_{t+1})$ in which the state $S_t$, the reward $r_{t+1}$, the action $a_t$, and the next state $S_{t+1}$ are associated with each other (Step S15).

A specific flow of the storing processing (Step S15) will be described with reference to FIG. 3. Firstly, as illustrated in FIG. 3, the storage processing unit 203 determines whether or not the experience data is stored up to the upper limit in the storage unit 21 associated with the performed action $a_t$ (Step S150A).

For example, when the action $a_t$ performed by the machine 3 is associated with the storage unit 21_1 among the plurality of storage units 21, the storage processing unit 203 determines whether the storage unit 21_1 stores the experience data up to the upper limit.

When the experience data is stored up to the upper limit in the storage unit 21_1 (Step S150A), the deletion processing unit 204 deletes the oldest experience data among pieces of the experience data stored in the storage unit 21_1 (Step S150B).

Then, the storage processing unit 203 stores new experience data $(S_t, r_{t+1}, a_t, S_{t+1})$ in the storage unit 21_1 (Step S150C), and returns to the flowchart of FIG. 2.

On the other hand, when the storage unit 21_1 does not store the experience data up to the upper limit (Step S150A: NO), the storage processing unit 203 stores the new experience data $(S_t, r_{t+1}, a_t, S_{t+1})$ in the storage unit 21_1 (Step S150C), and returns to the flowchart of FIG. 2.

Then, as illustrated in FIG. 2, the learning unit 205 randomly selects a predetermined number of pieces of experience data from each of the plurality of storage units 21 and extracts the experience data as learning data. The predetermined number may be set to a different value for each storage unit 21. In addition, the learning unit 205 may select the same number of pieces of learning data from each of the plurality of storage units 21. At this time, when the predetermined number of pieces of experience data is not stored in the storage unit 21, all pieces of experience data may be extracted as the learning data.

Then, the learning unit 205 calculates a TD error using Expression (1) as follows for the extracted learning data (Step S16).

[Expression 1]

$$r_{t+1} + \gamma \max_{a_{t+1}} Q(S_{t+1}, a_{t+1}; \theta^-) - Q(S_t, a_t; \theta_t) \tag{1}$$

The first term of Expression (1) indicates the reward $r_{t+1}$ (reward $r_{t+1}$ for the state $S_{t+1}$ after the action $a_t$ is performed) obtained for the action $a_t$ performed at a certain time t.

The second term of Expression (1) indicate an action having the highest action value among the plurality of actions $a_t$ the next time (t+1). Note that $\gamma$ is a discount rate, and any value from 0 to 1 is set (for example, 0.9 or the like). For example, the reward is the maximum when the machine 3 reaches the target state, and the discount rate is set such that the value decreases from this point to the past.

The third term of Expression (1) is an action value for the action $a_t$ performed at the time t.

Further, $\theta^-$ is a value fixed by the value of the weight $\theta$ set by the learning unit 205 at a certain time. The TD error depends on the weight $\theta_t$ in a neural network, and the convergence is not stable. Therefore, in Expression (1), $\theta^-$ fixed to the value of the weight $\theta$ at a certain time point is used, and $\theta^-$ is updated at regular intervals.

Then, the learning unit 205 updates the action value function $Q(S_t, a_t; \theta)$ based on the calculated TD error (Step S17).

In the present embodiment, the learning unit 205 updates the weight $\theta$ of the action value function $Q(S_t, a_t; \theta)$ by using the known technique such as the gradient descent method and Adam, such that the action selection unit 200 can select an ideal action (action having the maximum action value) in the learning mode.

Then, the learning unit 205 determines whether a predetermined period has elapsed from the previous update of $\theta^-$ (Step S18).

For example, when the learning unit 205 has performed learning (update of the action value function Q) n times or more after $\theta^-$ has been previously updated, the learning unit 205 determines that the predetermined period has elapsed. At this time, regarding the n times, any value is set in accordance with a problem setting, that is, in accordance with the difficulty of the problem, which means how many variations there are in the numerical values obtained as data such as the number of states and transitions as observation targets, the type of an action, and the number of actions.

When the predetermined period has elapsed from the previous update of $\theta^-$ (Step S18: YES), the learning unit 205 updates the value of the weight $\theta^-$ of the action value function $Q(S_t, a_t; \theta^-)$ used in Expression (1) described above, with the value of the weight $\theta$ updated in Step S17 (Step S19).

On the other hand, when the predetermined period has not elapsed from the previous update of $\theta^-$ (Step S18: NO), the learning unit 205 causes the process to return to Step S10.

Further, a case where the current mode is other than the learning mode (Step S11: NO) will be described.

At this time, the action selection unit 200 selects the action $a_t$ in which the action value calculated in Step S10 becomes the maximum, among the plurality of actions that may be taken in the current state $S_t$ (Step S20).

Then, the state acquisition unit 201 acquires the state $S_{t+1}$ of the machine 3 after the action $a_t$ is performed (next time t+1) (Step S21), and causes the process to return to Step S10.

Advantageous Effects

As described above, the decision-making device 2 according to the present embodiment includes the action selection unit 200 that selects any one of a plurality of actions allowed to be taken in the first state $S_t$ so that an environment performs the selected action, the state acquisition unit 201 that acquires the second state $S_{t+1}$ indicating a state after the action $a_t$ is performed, the reward acquisition unit 202 that acquires the reward $r_{t+1}$ as an index indicating whether the second state $S_{t+1}$ is desirable, and the storage processing unit 203 that stores experience data in the storage unit 21 associated with the action $a_t$ among the plurality of storage units 21, the experience data being data in which the first state $S_t$, the action $a_t$, the second state $S_{t+1}$, and the reward $r_{t+1}$ are associated with each other.

In the technology in the related art, pieces of the experience data for all the actions are collectively stored in one storage unit. For this reason, in the technology in the related art, there is a possibility that the experience data of an action that is performed a small number of times is overwritten by the experience data of an action that is performed a large number of times. As a result, only the experience data of the action that are performed a large number of times is intensively accumulated in the storage unit, and the learning accuracy of the action value function degreases.

However, the decision-making device 2 according to the present embodiment stores the experience data in the storage unit 21 that is different for each action. Thus, a situation in which the experience data of the action that is performed a small number of times is overwritten by the experience data of the action that is performed a large number of times does not occur. Thus, it is possible to prevent the occurrence of a situation in which the experience data stored in the storage unit 21 is biased depending on the degree of the selection frequency of the action.

In addition, the decision-making device 2 further includes the deletion processing unit 204 that, when the amount of the experience data stored in the storage unit reaches an upper limit value, deletes the oldest experience data.

As described above, since the decision-making device 2 stores the experience data in the storage unit 21 that is different for each action, even though the data is deleted in the FIFO manner, deletion of the experience data of the action that is performed a small number of times does not occur until the amount of the experience data reaches the upper limit value. Thus, the decision-making device 2 can adjust the amount of experience data in each storage unit 21 with a simple algorithm.

In addition, the decision-making device 2 further includes the learning unit 205 that randomly selects a predetermined number of pieces of the experience data from each of the plurality of the storage units 21 and extracts the selected pieces of the experience data as learning data, and updates a learning model (action value function) for estimating the action $a_t$ having the highest value in the first state $S_t$ based on the learning data.

In this manner, the learning unit 205 can select and learn the experience data associated with each of a plurality of actions without the bias.

Further, the learning unit 205 may select the same number of pieces of the experience data from each of the plurality of the storage units 21 and extracts the selected pieces of the experience data as the learning data.

In this manner, the learning unit 205 can select the experience data associated with each action without the bias and equally learn all actions, regardless of the degree of the number of times of performing each of a plurality of actions.

Further, when the number of pieces of the experience data stored in the storage unit 21 does not satisfies the predetermined number, the learning unit 205 may extract all pieces of the experience data as the learning data.

In this manner, for example, even when the number of times of performing a certain action $a_t$ the beginning of the learning is small, the learning unit 205 can learn the action.

Second Embodiment

Next, an unmanned system 1 according to a second embodiment of the present invention will be described. The components common with those in the first embodiment are denoted by the same reference signs, and detailed description thereof will be omitted.

In the present embodiment, the function of the storage processing unit 203 is different from that in the first embodiment.

The storage processing unit 203 according to the present embodiment stores experience data ($S_t$, $r_{t+1}$, $a_t$, $S_{t+1}$) in which the first state $S_t$, the action $a_t$, the second state $S_{t+1}$, and the reward $r_{t+1}$ are associated with each other, in the storage unit 21 associated with the reward $r_{t+1}$ among the plurality of storage units 21.

In the present embodiment, it is assumed that the reward acquired from the machine 3 by the reward acquisition unit 202 is a discrete value (for example, value 1 or value 2). In this case, the storage processing unit 203 assigns the storage units 21_1 and 21_2 to the values of the reward in advance, respectively. Then, the storage processing unit 203 performs a process of storing the experience data in the storage unit 21 assigned to each acquired value of the reward.

Figure 4:
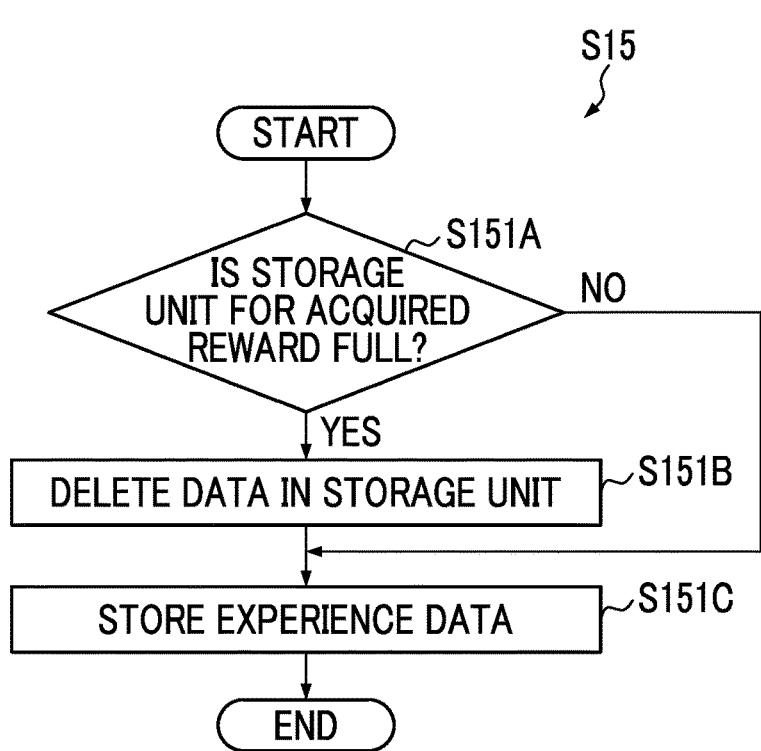
FIG. 4 is a flowchart illustrating an example of storing processing in a decision-making device according to a second embodiment.

Specifically, the storage processing unit 203 performs processing illustrated in FIG. 4 instead of the processing illustrated in FIG. 3, as the storing processing of Step S15 of FIG. 2.

(Processing Flow)

FIG. 4 is a flowchart illustrating an example of the storing processing in the decision-making device according to the second embodiment.

As illustrated in FIG. 4, the storage processing unit 203 determines whether or not the experience data is stored up to the upper limit in the storage unit 21 associated with the reward $r_{t+1}$ acquired in Step S14 of FIG. 2 (Step S151A).

For example, when the reward $r_{t+1}$ acquired in Step S14 is "value 1", the storage processing unit 203 determines whether or not the experience data is stored up to the upper limit in the storage unit 21_1 associated with "value 1" as the value of the reward $r_{t+1}$.

When the experience data is stored up to the upper limit in the storage unit 21_1 (Step S151A), the deletion processing unit 204 deletes the oldest experience data among pieces of the experience data stored in the storage unit 21_1 (Step S151B).

Then, the storage processing unit 203 stores new experience data ($S_t$, $r_{t+1}$, $a_t$, $S_{t+1}$) in the storage unit 21_1 (Step S151C), and returns to the flowchart of FIG. 3.

On the other hand, when the storage unit 21_1 does not store the experience data up to the upper limit (Step S151A: NO), the storage processing unit 203 stores the new experience data ($S_t$, $r_{t+1}$, $a_t$, $S_{t+1}$) in the storage unit 21_1 (Step S151C), and returns to the flowchart of FIG. 3.

In the above description, an example in which the reward acquired by the reward acquisition unit 202 is a discrete value, and the storage processing unit 203 assigns one storage unit 21 for each value of the reward is described. However, the present embodiment is not limited to this.

In another embodiments, the storage processing unit 203 may assign a plurality of values of the reward to one storage unit 21. For example, when the value of the reward has 10 levels of 1 to 10, the storage processing unit 203 may assign the values 1 to 5 as a first value band (range of the value as a low reward) to the storage unit 21_1, and assign the values 6 to 10 as a second value band (range of the value as a high reward) to the storage unit 21_2.

In still another embodiment, the reward acquired from the machine 3 by the reward acquisition unit 202 may be a continuous value based on a predetermined reward calculation expression. In this case, the storage processing unit 203 may store the experience data in the storage unit 21 assigned to each value band of the reward. Specifically, for example, if the value of the reward, which may be taken, is set to 0 to 1, the storage processing unit 203 may store the experience data in the storage unit 21_1 when the value of the reward $r_{t+1}$ acquired by the reward acquisition unit 202 is equal to or more than 0.0 and less than 0.1, and store the experience data in the storage unit 21_2 when the value of the reward $r_{t+1}$ is equal to or more than 0.1 and less than 0.2. In this manner, for example, even when the value of the reward is a continuous value and a different value is set for each event, the storage processing unit 203 can store the experience data for each value band of the reward without being biased. Thus, when there is an event (for example, event that the purpose is achieved) that has a low occurrence frequency, but is important, the storage processing unit 203 can more reliably store experience data regarding this event.

In addition, the machine 3 may calculate the reward $r_{t+1}$ based on the reward calculation expression that is different for each state $S_t$ or each action $a_t$, and the reward acquisition unit 202 may calculate the reward $r_{t+1}$ and the reward calculation expression used in the calculation from the machine 3. In this case, the storage processing unit 203 may store the experience data in the storage unit 21 assigned to each reward calculation expression, or may store the experience data in the storage unit 21 assigned to each value band of the reward. The storage processing unit 203 divides the storage units 21 by each reward calculation expression. Thus, for example, even when the reward calculation expression that is different for each event occurring as a result of the action is used, it is possible to sample the experience data for each reward calculation expression. Thus, a situation in which experience data regarding an event (that is, calculation expression having a small use frequency) having a low occurrence frequency is overwritten by the experience data regarding an event having a high occurrence frequency does not occur. Accordingly, it is possible to suppress the bias of the experience data.

Advantageous Effects

As described above, the storage processing unit 203 according to the present embodiment stores the experience data in which the action $a_t$, the second state $S_{t+1}$, and the reward $r_{t+1}$ are associated with each other, in the storage unit 21 associated with the reward $r_{t+1}$ among the plurality of storage units 21.

Generally, opportunities for obtaining a high reward in reinforcement learning are often set to be small, and it is difficult to accumulate experience data associated with a high reward. Further, in the technology in the related art, there is a possibility that the experience data associated with a high reward is overwritten by the experience data associated with a low reward. Therefore, in the technology in the related art, there is a possibility that only the experience data associated with the low reward is intensively stored.

However, the decision-making device 2 according to the present embodiment stores the experience data in the storage unit 21 that is different for each reward. Thus, a situation in which the experience data associated with the high reward is overwritten by the experience data associated with the low reward does not occur. Thus, even when the experience data associated with the high reward is acquired less frequently, it is possible to prevent the occurrence of a situation in which the experience data stored in the storage unit 21 is biased.

Further, the storage processing unit 203 stores the experience data in the storage unit 21 associated with each value of the reward.

In this manner, for example, when the value of the reward is a discrete value, the storage processing unit 203 can store the experience data for each value of the reward without being biased.

Further, the reward acquisition unit 202 acquires the reward and the reward calculation expression used in the calculation of the reward, and the storage processing unit 203 stores the experience data in the storage unit 21 associated with each reward calculation expression.

In this manner, for example, even when the machine 3 calculates a reward by using a plurality of reward calculation expressions, the storage processing unit 203 can sample the experience data for each reward calculation expression.

In addition, the storage processing unit 203 stores the experience data in the storage unit 21 associated with each value band of the reward.

In this case, for example, when the value of the reward is a continuous value, the storage processing unit 203 can store the experience data for each value band of the reward without being biased.

Further, the deletion processing unit 204 deletes the oldest experience data when the amount of experience data stored in the storage unit 21 reaches an upper limit value.

As described above, since the decision-making device 2 stores the experience data in the storage unit 21 that is different for each reward, even though the data is deleted in the FIFO manner, deletion of the experience data associated with a high reward does not occur until the amount of the experience data reaches the upper limit value. Thus, the decision-making device 2 can adjust the amount of experience data in each storage unit 21 with a simple algorithm.

Third Embodiment

Next, an unmanned system 1 according to a third embodiment of the present invention will be described.

The components common with those in the first and second embodiments are denoted by the same reference signs, and detailed description thereof will be omitted.

In the present embodiment, the function of the deletion processing unit 204 is different from that in the first and second embodiments.

When the amount of the experience data stored in the storage unit 21 reaches the upper limit value, the deletion processing unit 204 according to the present embodiment deletes the experience data used most in learning.

Figure 5:
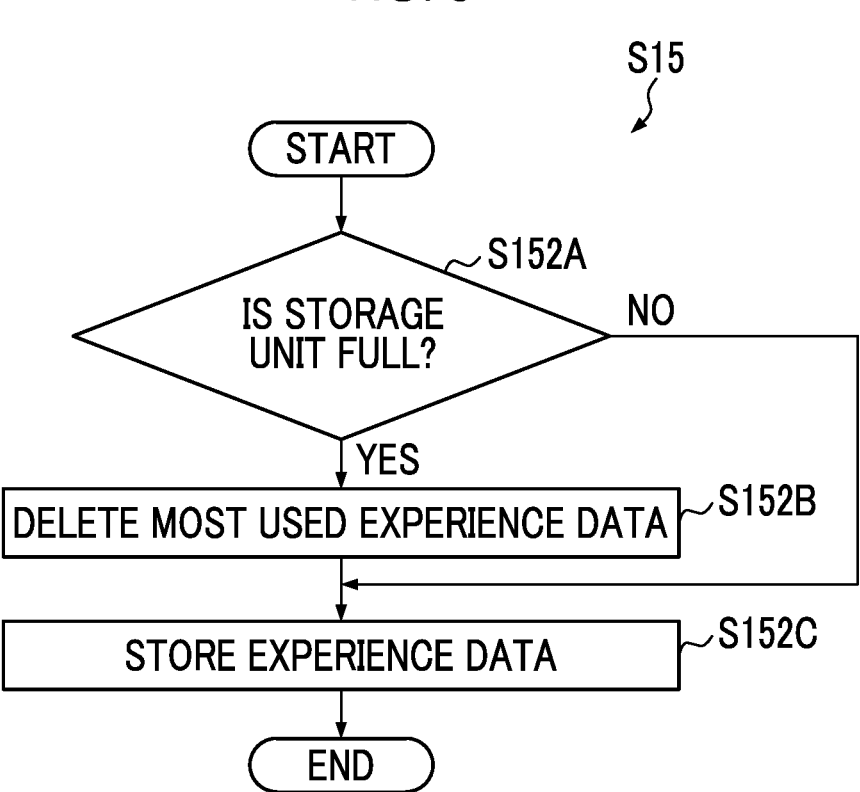
FIG. 5 is a flowchart illustrating an example of storing processing in a decision-making device according to a third embodiment.

Specifically, the deletion processing unit 204 performs processing illustrated in FIG. 5 instead of the processing illustrated in FIG. 3 or 4, as the storing processing of Step S15 of FIG. 2.

(Processing Flow)

FIG. 5 is a flowchart illustrating an example of storing processing in a decision-making device according to the third embodiment.

As illustrated in FIG. 5, the storage processing unit 203 determines whether or not the experience data is stored in the storage unit 21 up to the upper limit (Step S152A).

When the deletion processing unit 204 according to the present embodiment is applied to the first embodiment, the process of Step S152A is similar to the process of Step S150A in FIG. 3. When the deletion processing unit 204 according to this embodiment is applied to the second embodiment, the process of Step S152A is similar to the process of Step S151A in FIG. 4.

In the following example, it is assumed that the experience data as a target of the storing processing is associated with the storage unit 21_1.

When the experience data is stored up to the upper limit in the storage unit 21_1 (Step S152A), the deletion processing unit 204 deletes the experience data that is used most among pieces of the experience data stored in the storage unit 21_1 (Step S152B). It is assumed that the learning unit 205 records the number of times of using the experience data every time the experience data is selected as the learning data in Step S16 of FIG. 2.

Then, the storage processing unit 203 stores new experience data $(S_t, r_{t+1}, a_t, S_{t+1})$ in the storage unit 21_1 (Step S152C), and returns to the flowchart of FIG. 2.

On the other hand, when the storage unit 21_1 does not store the experience data up to the upper limit (Step S152A: NO), the storage processing unit 203 stores the new experience data $(S_t, r_{t+1}, a_t, S_{t+1})$ in the storage unit 21_1 (Step S152C), and returns to the flowchart of FIG. 2.

Advantageous Effects

As described above, when the amount of the experience data stored in the storage unit 21 reaches the upper limit value, the deletion processing unit 204 according to the present embodiment deletes the experience data used most in learning.

In this manner, the decision-making device 2 can leave the experience data having a low learning frequency in the storage unit 21, and thus it is possible to suppress the bias of the experience data used in learning.

Fourth Embodiment

Next, a specific example in which the decision-making device 2 described in the first to third embodiments is applied to an automatic operation of an automated aerial vehicle (AAV) will be described. An example in which the decision-making device 2 according to the first embodiment is applied to an AAV 3' will be described below.

Figure 6:
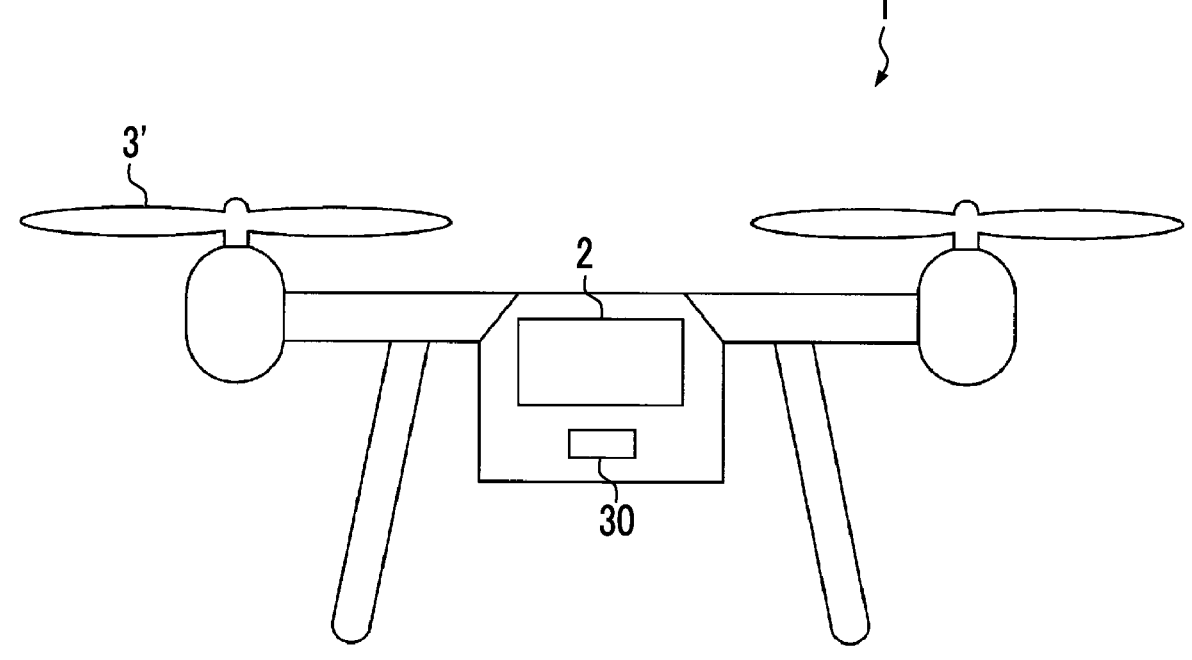
FIG. 6 is a diagram illustrating an example of an unmanned system according to a fourth embodiment.

FIG. 6 is a diagram illustrating an example of an unmanned system according to a fourth embodiment.

As illustrated in FIG. 6, the unmanned system 1 according to the present embodiment includes the AAV 3' and the decision-making device 2. In the present embodiment, it is assumed that the decision-making device 2 is mounted in the AAV 3'.

Further, a sensor 30 that measures the state of the AAV 3' is provided in the AAV 3'. The sensor 30 is, for example, a GPS, a gyro sensor, an acceleration sensor, or the like that measures position information (latitude, longitude, altitude) or the posture as the state of the AAV 3'.

Figure 7:
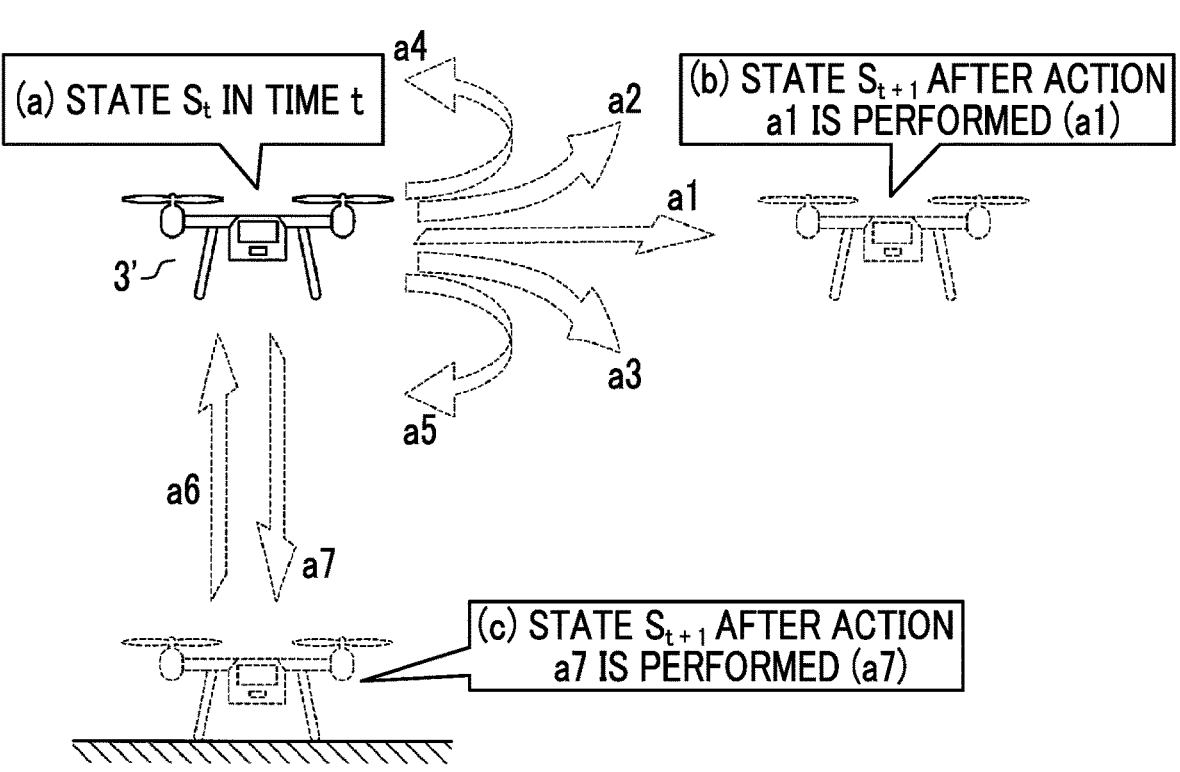
FIG. 7 is a diagram illustrating a function of the unmanned system according to the fourth embodiment.

FIG. 7 is a diagram illustrating a function of the unmanned system according to the fourth embodiment.

The learning processing in the decision-making device 2 applied to the AAV 3' will be described below with reference to FIGS. 2 and 7.

As illustrated in FIG. 2, firstly, the action selection unit 200 in the decision-making device 2 calculates an action value based on an action value function $Q(S_t, a_t; \theta)$ for each action that may be taken in the current state of the AAV 3' (Step S10).

As illustrated in FIG. 7, it is assumed that the AAV 3' is capable of performing seven actions, for example, being "a1 (forward driving), "a2 (left turn)", "a3 (right turn)", "a4 (rapid left turn)", "a5 (rapid right turn), "a6 (takeoff)", and "a7 (landing)". Further, it is assumed that the state $S_t$ of the AAV 3' at the current time t is the state illustrated in (a) in FIG. 7. In this case, the action selection unit 200 calculates action values for all the actions a1 to a7 that may be taken in the state $S_t$.

Then, the action selection unit 200 determines whether or not the current mode of the decision-making device 2 is a learning mode (Step S11).

When the current mode is the learning mode (Step S11: YES), the action selection unit 200 performs the processes of Steps S12 to S19.

On the other hand, when the current mode is not the learning mode (Step S11: NO), the action selection unit 200 executes the processes of Steps S20 to S21.

Firstly, a case where the current mode is the learning mode (Step S11: YES) will be described.

At this time, the action selection unit 200 selects any one action $a_t$ among a plurality of actions that may be taken in the current state $S_t$ (Step S12).

Then, the state acquisition unit 201 acquires the state $S_{t+1}$ of the AAV 3' after the action $a_t$ is performed (next time t+1) (Step S13).

For example, when the AAV 3' performs the action a1 (forward driving) as the action $a_t$ in the state $S_t$, the state illustrated in (b) in FIG. 7 is acquired as a state $S_{t+1}(a1)$ of the AAV 3' in the next time (t+1). Further, when the AAV 3' performs the action a7 (landing) as the action $a_t$ in the state $S_t$, the state illustrated in (c) in FIG. 7 is acquired as a state $S_{t+1}(a7)$ of the AAV 3' in the next time (t+1).

Then, the reward acquisition unit 202 acquires a reward $r_{t+1}$ from the AAV 3' (Step S14). The reward $r_{t+1}$ functions as an index indicating whether the state $S_{t+1}$ acquired in Step S13 is desirable.

For example, when the goal is that the AAV 3' reaches (lands on) a specified destination, the reward $r_{t+1}$ is set to obtain a positive reward if the AAV 3' approaches the destination and to obtain a negative reward if the AAV 3' lands on a place other than the destination, that is away from the destination.

Then, the storage processing unit 203 and the deletion processing unit 204 performs storing processing on experience data $(S_t, r_{t+1}, a_t, S_{t+1})$ in which the state $S_t$, the reward $r_{t+1}$, the action $a_t$, and the next state $S_{t+1}$ are associated with each other (Step S15).

For example, it is assumed that, when the actions that may be taken by the AAV 3' are seven being a1 to a7 as in the example of FIG. 7, the decision-making device 2 includes a plurality of storage units 21_1 to 21_7 associated with the respective actions a1 to a7. Thus, when the AAV 3' performs the action a1 (forward driving) as the action $a_t$, the storage processing unit 203 performs the processes of Steps S150A to S150C in FIG. 3 to store the experience data in the storage unit 21_1 associated with the action a1.

When the decision-making device 2 according to the second embodiment is applied to the AAV 3', the storage processing unit 203 performs the processes of Steps S151A to S151C in FIG. 4 as the storage processing of Step S15 in FIG. 2. In addition, when the decision-making device 2 according to the third embodiment is applied to the AAV 3', the storage processing unit 203 performs the processes of Steps S152A to S152C in FIG. 5 as the storage processing of Step S15 in FIG. 2.

Then, as illustrated in FIG. 2, the learning unit 205 randomly selects a predetermined number of pieces of experience data from each of the plurality of storage units 21 and extracts the experience data as learning data. Then, the learning unit 205 calculates the TD error using Expression (1) described above for the extracted learning data (Step S16).

Here, the discount rate $\gamma$ in the second term of Expression (1) is set, for example, such that the reward is the maximum at a time point when the AAV 3' arrives at the destination, and the value decreases from this time point to the past.

Then, the learning unit 205 updates the action value function $Q(S_t, a_t; \theta)$ based on the calculated TD error (Step S17).

Then, the learning unit 205 determines whether a predetermined period has elapsed from the previous update of $\theta^-$ (Step S18).

When the predetermined period has elapsed from the previous update of $\theta^-$ (Step S18: YES), the learning unit 205 updates the value of the weight $\theta^-$ of the action value function $Q(S_t, a_t; \theta^-)$ used in Expression (1) described above, with the value of the weight e updated in Step S17 (Step S19).

On the other hand, when the predetermined period has not elapsed from the previous update of $\theta^-$ (Step S18: NO), the learning unit 205 causes the process to return to Step S10.

Further, a case where the current mode is other than the learning mode (Step S11: NO) will be described.

At this time, the action selection unit 200 selects, as the action $a_t$, the action in which the action value calculated in Step S10 becomes the maximum, among the plurality of actions a1 to a7 that may be taken in the current state $S_t$ (Step S20).

Then, the state acquisition unit 201 acquires the state $S_{t+1}$ of the AAV 3' after the action $a_t$ is performed (next time t+1) (Step S21), and causes the process to return to Step S10.

Advantageous Effects

As described above, the decision-making device 2 according to the present embodiment is mounted in the AAV 3'.

In this manner, the AAV 3' can automatically learn the best action in the learning mode, and, in modes other than the learning mode, the AAV 3' can estimate and select the best action based on the learned learning model (action value function) and automatically perform the selected action.

(Hardware Configuration)

Figure 8:
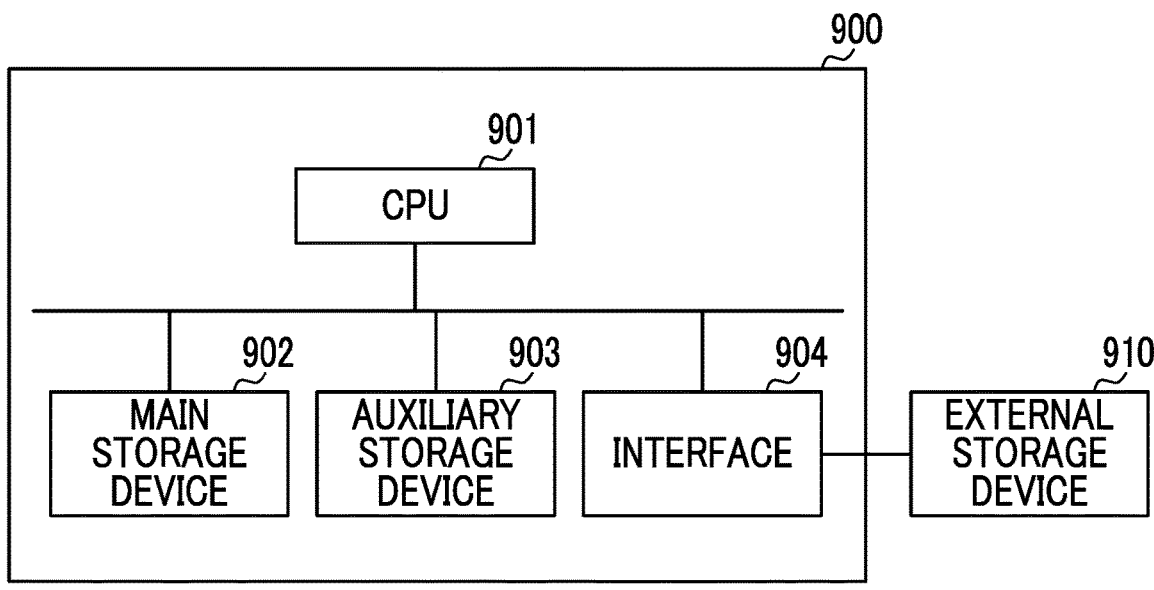
FIG. 8 is a diagram illustrating an example of a hardware configuration of the decision-making device according to at least one of the embodiments.

FIG. 8 is a diagram illustrating an example of a hardware configuration of the decision-making device according to at least one of the embodiments.

An example of the hardware configuration of the decision-making device 2 will be described below with reference to FIG. 8.

As illustrated in FIG. 8, a computer 900 includes a CPU 901, a main storage device 902, an auxiliary storage device 903, and an interface 904.

The decision-making device 2 described above is implemented in the computer 900. The operation of each processing unit described above is stored in the auxiliary storage device 903 in the form of a program. The CPU 901 (CPU 20) reads out the program from the auxiliary storage device 903, develops the program in the main storage device 902, and performs the above processing in accordance with the program. Further, the CPU 901 secures a storage area to be used by the decision-making device 2 for various types of processing, in the main storage device 902 in accordance with the program. Further, the CPU 901 secures a storage area (storage unit 21) for storing data being processed, in the auxiliary storage device 903 in accordance with the program.

Examples of the auxiliary storage device 903 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The auxiliary storage device 903 may be an internal medium that is directly connected to a bus of the computer 900 or be an external medium that is connected to the computer 900 through the interface 904 or a communication line. In addition, when the program is distributed to the computer 900 by the communication line, the computer 900 that receives the distribution may develop the program in the main storage device 902 and perform the above processing. In at least one of the embodiments, the auxiliary storage device 903 is a storage medium of a non-transitory type.

The program may be provided to realize some of the functions described above. Further, the program may be a so-called difference file (difference program) that realizes the above-described function in combination with another program already stored in the auxiliary storage device 903.

Hitherto, the embodiments of the present invention have been described in detail above, but the present invention is not limited thereto without departing from the technical idea of the present invention, and some design changes and the like may be made.

For example, in the above-described embodiment, the form in which the decision-making device 2 is applied to the AAV 3' has been described, but the present invention is not limited to the form. For example, in other embodiments, the decision-making device 2 may be applied to various machines that operate in unmanned manner. For example, the decision-making device 2 may be applied to a robot arm, an industrial robot, an autonomous driving car, and a transport vehicle.

Further, in the above-described embodiment, a form in which the reward acquisition unit 202 in the decision-making device 2 acquires the reward from the machine 3 (AAV 3') has been described, but the present invention is not limited to the form. The reward acquisition unit 202 may store the reward calculation expression corresponding to the machine 3 as an observation target in advance and calculate and acquire the reward for the action $a_t$ of the machine 3 by calculation using the reward calculation expression.

INDUSTRIAL APPLICABILITY

According to at least one of the embodiments of the present invention, it is possible to suppress the bias of experience data.

REFERENCE SIGNS LIST

1 Unmanned system
2 Decision-making device
20 CPU
21 Storage unit
200 Action selection unit
201 State acquisition unit
202 Reward acquisition unit
203 Storage processing unit
204 Deletion processing unit
205 Learning unit
3 Machine
3' Automated aerial vehicle (AAV)
30 Sensor

The invention claimed is:

1. A decision-making device that is used in an unmanned system having a machine that operates in an unmanned manner, the device comprising:

a hardware processor; and a plurality of storage units, each of which is assigned to only one corresponding action of a plurality of actions that are performed by the machine, wherein the hardware processor functions as:

an action selection unit that selects any one of the plurality of actions allowed to be taken in a first state so that an environment performs the selected action;

a state acquisition unit that acquires a second state indicating a state after the selected action is performed;

a reward acquisition unit that acquires a reward as an index indicating whether the second state is desirable; and a storage processing unit storing experience data in a storage unit i) that is one of the plurality of storage units and ii) that is assigned to a specific action determined to be same as the selected action, wherein the specific action belonging to one of the plurality of actions, the experience data being data in which the first state, the selected action, the second state, and the reward are associated with each other, wherein the decision-making device functions as an agent that observes what state the machine has transitioned to due to the selected action, and performs reinforcement learning to determine an action in response to the observed state, wherein respective experience data is stored in a storage unit of each of the plurality of storage units, each of which is configured to receive different experience data associated with a different selected action among the plurality of storage units, thus, a situation is configured to be prevented in which experience data of a first selected action are overwritten by experience data of a second selected action that is performed more frequently than the first selected action in each of the plurality of storage units, and wherein the hardware processor further functions as a deletion processing unit that, in response to an amount of experience data stored in a storage unit of the plurality of storage units reaching an upper limit value, deletes experience data used most in learning.

2. The decision-making device according to claim 1, wherein the hardware processor further functions as:

a deletion processing unit that, when an amount of experience data stored in a storage unit of the plurality of storage units reaches an upper limit value, deletes the oldest experience data.

3. The decision-making device according to claim 1, wherein the hardware processor further functions as:

a learning unit that randomly selects and extracts a predetermined number of pieces of experience data from each of the plurality of storage units as learning data, and updates a learning model for estimating an action having a highest value in the first state based on the learning data.

4. The decision-making device according to claim 3, wherein the learning unit selects and extracts the same number of pieces of experience data from each of the plurality of storage units as the learning data.

5. The decision-making device according to claim 3, wherein, when a number of pieces of experience data stored in a storage unit of the plurality of storage units does not satisfy the predetermined number, the learning unit extracts all the pieces of experience data as the learning data.

6. An unmanned system comprising:
the decision-making device according to claim 1.

7. The decision-making device according to claim 1, wherein the reward acquired by the reward acquisition unit is a continuous value based on a predetermined reward calculation expression.

8. A decision-making method of a decision-making device that is used in an unmanned system having a machine that operates in an unmanned manner, the device comprising a hardware processor and a plurality of storage units, each of which is assigned to only one corresponding action of a plurality of actions that are performed by the machine, the method comprising:

a step of selecting any one of the plurality of actions allowed to be taken in a first state so that an environment performs the selected action;

a step of acquiring a second state indicating a state after the selected action is performed;

a step of acquiring a reward as an index indicating whether the second state is desirable; and a step of storing experience data in a storage unit i) that is one of the plurality of storage units and ii) that is assigned to a specific action determined to be same as the selected action, wherein the specific action belonging to one of the plurality of actions, the experience data being data in which the first state, the selected action, the second state, and the reward are associated with each other, wherein the method further comprising a step of observing what state the machine has transitioned to due to the selected action, and performing reinforcement learning to determine an action in response to the observed state, wherein respective experience data is stored in a storage unit of each of the plurality of storage units, each of which is configured to receive different experience data associated with a different selected action among the plurality of storage units, thus, a situation is configured to be prevented in which experience data of a first selected action are overwritten by experience data of a second selected action that is more frequently performed than the first selected action in each of the plurality of storage units, and wherein the method further comprising a step of deleting, in response to an amount of experience data stored in a storage unit of the plurality of storage units reaching an upper limit value, experience data used most in learning.

9. The decision-making method according to claim 8, wherein the reward acquired in the step of acquiring the reward is a continuous value based on a predetermined reward calculation expression.

10. A non-transitory computer-readable medium that stores a program causing a computer of a decision-making device that is used in an unmanned system having a machine that operates in an unmanned manner to function, the device comprising a hardware processor and a plurality of storage units, each of which is assigned to only one corresponding action of a plurality of actions that are performed by the machine, the program causing the computer to execute:

a step of selecting any one of the plurality of actions allowed to be taken in a first state so that an environment performs the selected action;

a step of acquiring a second state indicating a state after the selected action is performed;

a step of acquiring a reward as an index indicating whether the second state is desirable; and a step of storing experience data in a storage unit i) that is one of the plurality of storage units and ii) that is assigned to a specific action determined to be same as the selected action, wherein the specific action belonging to one of the plurality of actions, the experience data being data in which the first state, the selected action, the second state, and the reward are associated with each other, wherein the program further causes the computer to execute a step of observing what state the machine has transitioned to due to the selected action, and performing reinforcement learning to determine an action in response to the observed state, wherein respective experience data is stored in a storage unit of each of the plurality of storage units, each of which is configured to receive different experience data associated with a different selected action among the plurality of storage units, thus, a situation is configured to be prevented in which experience data of a first selected action are overwritten by experience data of a second selected action that is more frequently performed than the first selected action in each of the plurality of storage units, and wherein the program further causes the computer to execute a step of deleting, in response to an amount of experience data stored in a storage unit of the plurality of storage units reaching an upper limit value, experience data used most in learning.

11. The non-transitory computer-readable medium according to claim 10, wherein the reward acquired in the step of acquiring the reward is a continuous value based on a predetermined reward calculation expression.

12. A decision-making device that is used in an unmanned system having a machine that operates in an unmanned manner, the device comprising:

a hardware processor; and a plurality of storage units each of which is assigned to only one corresponding action of a plurality of actions that are performed by the machine, wherein the hardware processor functions as:

an action selection unit that selects any one of the plurality of actions allowed to be taken in a first state so that an environment performs the selected action;

a state acquisition unit that acquires a second state indicating a state after the selected action is performed;

a reward acquisition unit that acquires a reward as an index indicating whether the second state is desirable; and a storage processing unit storing experience data in a storage unit i) that is one of the plurality of storage units and ii) that is assigned to a specific action determined to be same as the selected action, wherein the specific action belonging to one of the plurality of actions, the experience data being data in which the first state, the selected action, the second state, and the reward are associated with each other, wherein the decision-making device functions as an agent that observes what state the machine has transitioned to due to the selected action, and performs reinforcement learning to determine an action in response to the observed state, wherein respective experience data is stored in a storage unit of each of the plurality of storage units, each of which is configured to receive different experience data associated with a different selected action among the plurality of storage units, thus, a situation is configured to be prevented in which experience data of a first selected action are overwritten by experience data of a second selected action that is performed more frequently than the first selected action in each of the plurality of storage units, wherein the hardware processor further functions as a learning unit that selects and extracts experience data from the plurality of storage units as learning data, and updates a learning model for estimating an action having a highest value in the first state based on the learning data; and wherein, in response to a number of pieces of experience data stored in a storage unit of the plurality of storage units not satisfying a predetermined number of pieces of experience data from each of the plurality of storage units, the learning unit extracts all the pieces of experience data as the learning data.

* * * * *